United States Patent [19]

Namenye et al.

[11] Patent Number: 5,272,610

[45] Date of Patent: Dec. 21, 1993

[54] LIGHT FIXTURE WITH TRIM STRIP RETAINER

[75] Inventors: Joseph A. Namenye, Elkhart, Ind.; Eugene L. Kilbourn, Marshall; Jeffrey L. Cornell, Coldwater, both of Mich.

[73] Assignee: Progressive Dynamics, Inc., Marshall, Mich.

[21] Appl. No.: 822,921

[22] Filed: Jan. 21, 1992

[51] Int. Cl.⁵ ............................................. F21Y 5/00
[52] U.S. Cl. .................................. 362/351; 362/457; 362/806
[58] Field of Search .................. 362/35, 61, 74, 217, 362/223, 224, 244, 246, 249, 311, 362, 433, 457, 458, 806, 351, 255, 268

[56] References Cited

U.S. PATENT DOCUMENTS

| | | | |
|---|---|---|---|
| 1,766,199 | 6/1930 | Smith | 362/351 |
| 2,120,188 | 6/1938 | Reichard | 362/351 |
| 2,596,879 | 5/1952 | Warren et al. | 362/255 |
| 4,390,930 | 6/1983 | Herst et al. | 362/223 |
| 4,464,707 | 8/1984 | Forrest | 362/223 |
| 4,595,904 | 6/1986 | Gosswiller et al. | 362/35 |
| 4,858,088 | 8/1989 | Agabekov | 362/223 |
| 5,091,828 | 2/1992 | Jincks et al. | 362/35 |

*Primary Examiner*—Richard R. Cole
*Attorney, Agent, or Firm*—Beaman & Beaman

[57] ABSTRACT

A light fixture having an arcuate convex lens includes a decorative strip extending across the lens convex configuration usually adhered thereto by an adhesive mounted on the strip. Decorative strip end retainers are homogeneously defined at lateral edges of the lens and comprise recesses having an opening adjacent the lens exterior convex surface whereby the decorative strip ends are received within the recess opening and the recesses retain the decorative strip end preventing the ends from pulling away from the lens surface.

18 Claims, 1 Drawing Sheet

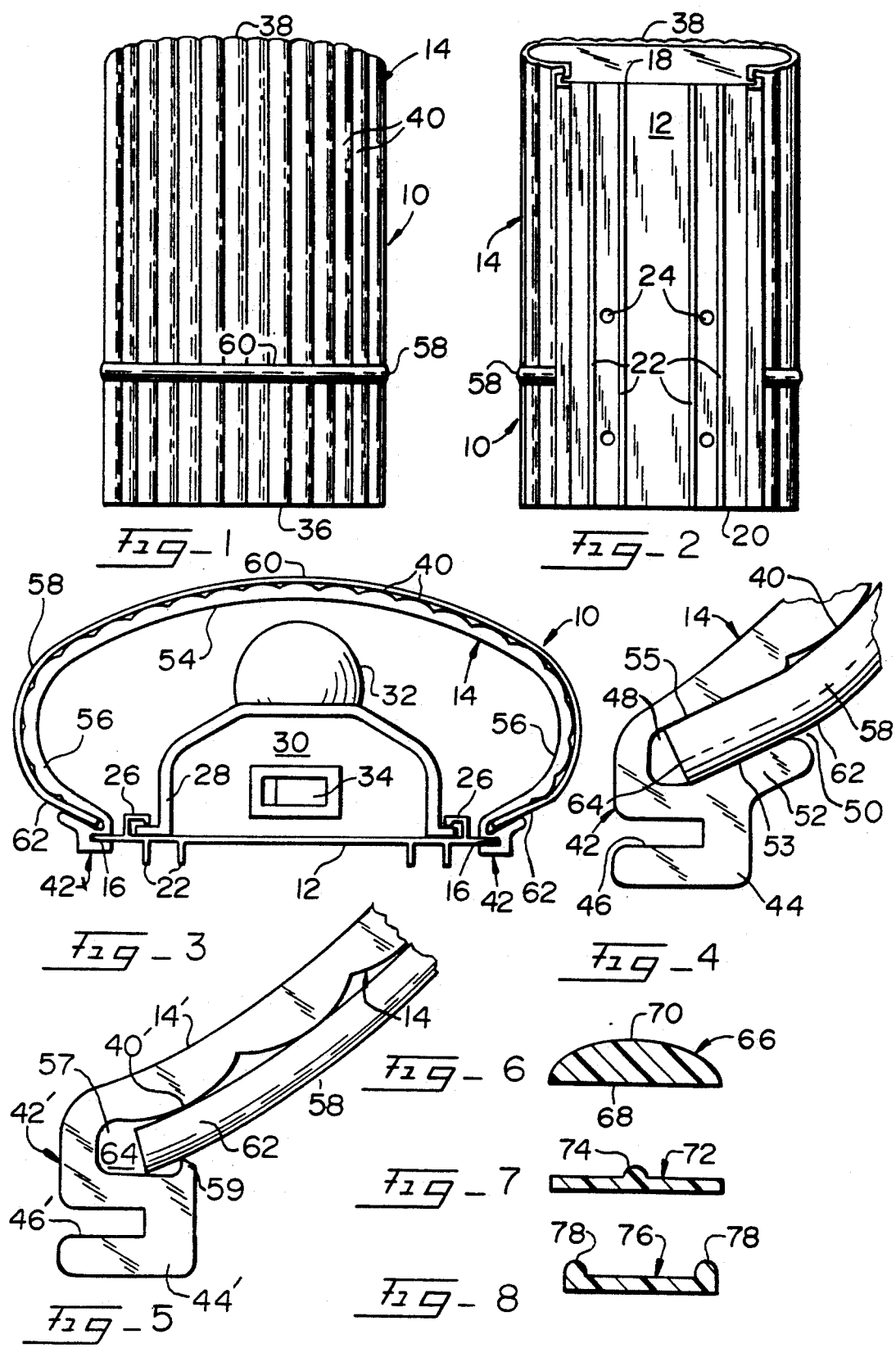

LIGHT FIXTURE WITH TRIM STRIP RETAINER

BACKGROUND OF THE INVENTION

1. Field of the Invention.

The invention pertains to light fixtures having a convex configuration receiving a decorative strip adhered thereto wherein retainers formed on the light fixture receive the ends of the decorative strip to maintain the strip ends in a contiguous relationship with the light fixture configuration.

2. Description of the Related

Light fixtures, particularly those used with recreational vehicles such as trailers, motor homes, boats, and the like, often consist of a base which is mounted upon the vehicle wall and a translucent or transparent lens is attached to the base wherein a bulb mounted upon the base emits light through the lens.

For aesthetic purposes, decorations may be mounted upon the lens or incorporated into the configuration thereof. A popular decorative feature is to mount an elongated decorative strip upon the lens which is of a contrasting color and pleasing configuration. Such decorative strips are often formed of vinyl and include a flat inner surface coated with an adhesive to permit the strip to adhere to the lens.

When an adhesive mounted vinyl decorative strip is extended across the exterior surface of a lens having an arcuate convex configuration the flexible nature of the strip will permit the strip to follow the contour of the lens exterior surface and permit the strip to be attached directly to the lens surface by the adhesive. However, the vinyl material of which the decorative strip is formed has an elastomeric characteristic, and memory, and internal forces within the strip try to return the strip to its original linear configuration. The bonding forces of the strip adhesive on the lens are usually sufficient to overcome the internal "memory" forces within the decorative strip if the deformation of the strip has not been extreme. However, with some types of lens configurations the greatest degree of curvature exists adjacent the lateral edges of the lens to which the decorative strip ends are attached. Accordingly, over a period of time the arcuate deformation of the decorative strip end regions required to conform the strip to the lens configuration will create sufficient internal forces within the strip vinyl material to overcome the adhesive forces at the strip end regions and permit the strip ends to pull or "peel" away from the lens exterior surface. Such disassembly of the strip end regions from the lens is unattractive and commercially unacceptable, and such occurrences may not occur until some time after the light fixture has been installed in a vehicle, and the lens and decorative strips have been exposed to the heat generated by the light fixture bulb. This tendency for decorative strips to separate from arcuate convex lenses has severely limited the use of such decorative strips with many light fixture and light fixture lens configurations, and heretofore, this type of end region separation from arcuate convex light fixture configurations has been very troublesome and unresolvable.

SUMMARY OF THE INVENTION

Objects of the Invention

It is an object of the invention to provide a light fixture having an arcuate convex configuration receiving decorative strips wherein the decorative strip end regions are mechanically retained adjacent the convex configuration.

Another object of the invention is to provide a light fixture having decorative strips disposed across a convex configuration wherein spaced decorative strip end retainers are defined upon the light fixture for receiving the decorative strip ends and mechanically retain the strip ends contiguous to the light fixture convex surface.

Yet another object of the invention is to provide a light fixture having an arcuate convex configuration upon which decorative end strips are adhered wherein spaced end strip retainers are homogeneously defined within the material of the light fixture, and the retainers include a recess having an opening adjacent the convex surface and in an embodiment a hook configuration within the recess opening engages the decorative strip end region for aiding the maintaining of the end region within the recess and adjacent the light fixture convex surface.

In the practice of the invention, one or more decorative strips are attached to an arcuate convex configuration of a light fixture. The decorative strips are preferably formed of a vinyl or similar material usually having an adhesive side as to adhere to the light fixture surface. Usually, the light fixture surface receiving the decorative strip constitutes a translucent lens mounted upon a base, and the decorative strip extends across the lens convex configuration and the length of the decorative strip conforms to the arcuate convex form of the lens exterior surface.

In the disclosed embodiment of the inventive concepts, the lens is of an extruded elongated configuration having an exterior arcuate convex configuration which includes parallel spaced lateral edges. The lateral edges are each formed with a head of a configuration which includes a slot for permitting the head to be supported on the edges of the light fixture base. Such slots face inwardly toward each other, and the resilient nature of the lens, which may be formed of acrylic, permits the lens to be slightly deformed to an "open" configuration to receive the base edges within the slots.

The lens heads also each include an outwardly opening recess having an opening adjacent the lens exterior convex surface adjacent the lateral edge heads. In a variation, these recesses each include an opening defined by a hook edge formed in the head having a sharpened end disposed toward the recess opening.

The decorative strip, or strips, to be mounted upon the lens exterior surface may include an adhesive side which is placed against the lens exterior surface for bonding thereto. The length of the decorative strips, which extend across the curved width of the lens, is such that the strip ends will be received within the recesses defined upon the lens lateral edge heads. The dimension of the recess's openings is such as to tightly receive the ends of the decorative strips, and the recesses frictionally engage the decorative strip ends. Accordingly, the ends of the decorative strips are mechanically retained adjacent the configuration of the lens at the strip ends and the strip ends are mechanically retained against "peeling" away from the lens configuration due to internal elastic forces within the decorative strip material. In the retainer recess embodiment using hooks the hooks may slightly penetrate the strip material to increase the frictional retention.

Preferably, the lens is formed by an extrusion process having a uniform transverse cross sectional configuration throughout its length, and the decorative strip end receiving recesses may be readily homogeneously formed into the lens by the extrusion process, and do not detract from the lens appearance. A wide variety of decorative strip cross sectional configurations and shapes may be received within the retainers, and the retainers permit a wide variety of decorative strips or other members which might be desired to be attached to the lens to be accommodated and mechanically retained on the lens.

BRIEF DESCRIPTION OF THE DRAWINGS

The aforementioned objects and advantages of the invention will be appreciated from the following description and accompanying drawings wherein:

FIG. 1 is a front elevational view of a light fixture in accord with the invention, FIG. 2 is a rear elevational view of the light fixture of FIG. 1, FIG. 3 is a bottom view of the light fixture, illustrating the lamp and supporting mechanism behind the lens, FIG. 4 is an enlarged detail lens end view illustrating the end of a decorative strip being received within the decorative strip end retainer, FIG. 5 is an enlarged detail end view of an embodiment of a lens lateral edge having a recess using a hook, the decorative strip being received within the recess, and FIGS. 6, 7 and 8 are elevational sectional views of various configurations of decorative strips which may be utilized with the light fixture of the invention.

DESCRIPTION OF THE PREFERRED EMBODIMENTS

In the drawing the light fixture is generally indicated at 10, and the fixture includes a base 12 upon which the lens 14 is mounted. The light fixture 10 is of the wall mounted type as often used with recreational vehicles, and the base 12 may be extruded of aluminum or other material.

The base 12 includes parallel lateral edges 16, FIG. 3, a top 18, and a bottom 20, FIG. 2. A plurality of elongated legs 22 extend from the outer back surface of the base for supporting the base plane away from the wall, and holes 24, FIG. 2, formed in the base receive screws, not shown, whereby the base may be attached to a supporting wall.

On its inner surface, the base 12 includes elongated hooks 26 for receiving the legs 28 of the bulb support 30, FIG. 3, and the incandescent bulb 32 is mounted upon the bulb support 30, as is the switch 4 which is accessible from the bottom of the fixture.

The lens 14 is preferably formed of a light translucent material such as acrylic. The lens material may be white or colored, and if desired, the lens could be opaque whereby the light emitting from the bulb 32 is only cast upwardly or downwardly. It is to be understood that in the practice of the invention the particular material and light transmitting characteristics of the lens 14 does not constitute an aspect of the instant invention. However, the arcuate convex configuration of the lens is an aspect of the inventive concept, and the definition of the term "lens" is not to be limited to the specific component illustrated.

The lens 14 includes a bottom edge 36, FIG. 1, and an upper edge 38. Preferably, the upper edge 38 is disposed in a plane angularly related to the horizontal and the bottom 36.

Preferably, the lens 14 is formed by an extrusion process and the lens outer surface is formed with a plurality of parallel vertical flutes 40 to give the lens a pleasing aesthetic appearance, and for light diffusion purposes. As best appreciated from FIG. 3, the lens 14 is of a general arcuate convex configuration widthwise and includes spaced parallel lateral edges 42 which define the terminal lateral edges of the lens.

Each of the lateral edges 42 is formed with an enlarged homogeneous head 44 which is of a configuration best appreciated from FIGS. 4 and 5. The heads 44 each include an elongated slot 46 extending the length of the head and opening inwardly wherein the slots 46 are in opposed relationship to each other. The slots 46 are adapted to closely receive the base edges 16, and in this manner the lens 14 is snugly mounted upon the base 12 as desired. The resilient nature of the lens material will permit the lens configuration to be "opened" sufficiently to accept the base edges 16 within the lens slots 46, and the resilient nature of the lens will cause the heads 44 to snugly grip the base 12.

Each of the heads 44 also includes an elongated outwardly opening recess 48 which extends the length of the head, and each recess 48 includes an opening 50 disposed adjacent to the lens exterior surface. Each recess 48 is defined by an extension 52 which defines a flat surface 53 which is parallel to and spaced from the flat recess surface 55 as will be appreciated from FIG. 4.

As apparent from FIG. 3, the cross sectional configuration of the lens 14 is arcuate and outwardly convex, and the lens includes a central outer radius portion 54 which is of a larger diameter than the lens convex portions 56 located adjacent the heads 44. This configuration of the lens permits the lens to have an attractive appearance, yet keeps the light fixture from excessively extending from the supporting wall.

For aesthetic purposes, it is desirable to have at least one decorative strip 58 extending across the outer surface of the lens 14 as appreciated from FIGS. 1-3. If desired, a plurality of decorative strips 58 could be used, but for simplified purpose of illustration only a single strip is shown as mounted upon the lens.

The decorative strip 58 is preferably formed of a vinyl material, and may have a variety of cross sectional configurations. The inner surface of the decorative strip is flat and is preferably provided with an adhesive material wherein the strip 58 will adhere to the outer surface of the lens 14 and the decorative strip includes the central region 60 which extends over the lens portion 54 while the strip end regions 62 extend over the lens portions 56.

As will be appreciated from FIG. 4, the decorative strip ends 64 are snugly received within the recesses 48 between the surfaces 53 and 55, and the recesses 48 constitute retainers for holding the decorative strip end regions 62 firmly against the exterior surface of the lens adjacent the lens lateral edges 42.

The adhesive located on the inner side of the decorative strip 58 engages the flutes 40 and the bonding between the adhesive and the flutes 40 is sufficient to maintain the decorative strip 58 in the desired location adjacent the central region 54 of the lens in that the diameter of the lens at the central region is not as small, and the degree of bending of the decorative strip is not as great, as occurs at the lens regions 56, FIG. 3. While, initially, the decorative strip adhesive will maintain the decorative strip bonded to the exterior surface of the lens at the portions 56, the internal stresses within the decorative strip vinyl material will, over a period of time, overcome the adhesive bonding and the end regions 62 will pull and peel away from the lens regions 56 if not restrained. In the practice of the invention the decorative strip end regions 62 are located within the lens recesses 48 and the recesses constitute mechanical retainers which physically maintain the decorative strip end regions 62 in engagement with the lens portions 56 even as the adhesive ages and weakens.

A variation of a lens decorative strip retainer is shown in FIG. 5 wherein components similar to those previously described are indicated by primed reference numerals. The recess 57 includes a hook 59 having a sharp end which extends toward the flutes 40', and upon the decorative strip end region 62 being inserted into the recess 57 the hook 59 may imbed into the strip to enhance the frictional retention.

The decorative strips may be formed of material other than vinyl, and may have various cross sectional configurations as will be apparent from FIGS. 6, 7 and 8. In FIG. 6 the decorative strip 66 includes the flat inner surface 68 upon which the adhesive is attached, and the outer surface 70 is of a convex configuration and may be painted or plated with an attractive coating or color which is in contrast to the lens color.

FIG. 7 illustrates a different configuration of decorative strip 72 having the flat adhesive coated lower surface and the outer surface includes a decorative rib 74 which may be color contrasted to the lens. FIG. 8 illustrates the decorative strip 76 having a flat adhesive lower surface and a pair of parallel ribs 78 are located at the strip edges.

With the practice of the invention utilizing the retaining recesses 48 at the lens lateral edges, it is possible to use a wider variety of decorative strips of different materials than previously employable. The use of the retaining recesses 48 permits decorative strips to be used which may have a relatively stiff resiliency, but the mechanical retention of the end regions of the decorative strips within the recesses 48 will assure the proper assembly of the decorative strip and lens over the life of the light fixture.

It is appreciated that the retainers for the decorative strip end regions may take forms other than those illustrated, and the retainers do not necessarily have to be located at the lateral edges of the lens. For instance, the retainers could be located at the lens regions 56, and by incorporating the recesses into the exterior configuration of the lens no detraction from the lens appearance would exist. By homogeneously forming the retainer recesses 48 of the lens material an economical and attractive appearance is achieved, and it is appreciated that various modifications to the inventive concepts may be apparent to those skilled in the art without departing from the spirit and scope of the invention.

We claim:

1. A light fixture lens having, in combination, an arcuate convex outer surface configuration, and a pair of spaced decorative strip end region receiving recesses forming retainers defined on said lens located on opposite sides of said arcuate convex outer surface configuration adapted to receive a flexible resilient decorative strip, said strip end region recesses each having an opening located adjacent the lens outer convex surface configuration.

2. In a light fixture lens as in claim 1, said lens being formed by extrusion molding and said strip end region retainers being homogeneously formed of the material of said lens.

3. In a light fixture lens as in claim 1, said lens having spaced side edges, a head defined at each side edge, one of said strip end region retainer recesses defined in each head.

4. In a light fixture lens as in claim 3, a hook defined in each retainer recess opening extending toward the lens outer surface.

5. In a light fixture lens as in claim 3, said lens being formed by extrusion molding and said heads being homogeneously defined of the material of the lens.

6. In a light fixture lens as in claim 3, said recesses each including spaced, opposed, substantially parallel surfaces adapted to receive a decorative strip therebetween.

7. In a light fixture lens as in claim 6, a lens mounting slot defined in each of said heads.

8. A light fixture having a base, a lens mounted on the base having a convex outer surface configuration, an elongated, resilient, decorative strip having a lens engaging side and end regions, the strip extending across the lens convex surface configuration, the improvement comprising spaced decorative strip end region retainers mounted on the lens receiving the strip end regions and preventing displacement of the strip end regions from the lens outer surface, said strip end region retainers being located adjacent the lens convex outer surface and maintaining the strips' end regions in engagement with the lens outer surface and being homogeneously formed of the material of the lens.

9. In a light fixture as in claim 8, said lens and strip end region retainers being extrusion molded of a synthetic plastic material.

10. A light fixture having a base, a lens mounted on the base having a convex outer surface configuration, an elongated, resilient, decorative strip having a lens engaging side and end regions, the strip extending across the lens convex surface configuration, the improvement comprising spaced decorative strip end region retainers mounted on the lens receiving the strip end regions and preventing displacement of the strip end regions from the lens outer surface, the base including side edges, the lens including side edge heads, a slot defined in each lens side edge head receiving a base side edge, said strip end region retainers being located at said lens' side edge heads.

11. In a light fixture as in claim 10, said strip end region retainers comprising elongated recesses defined in said lens side edge heads each having an opening located adjacent the lens outer surface receiving a decorative strip end region.

12. In a light fixture as in claim 11, said recesses each including spaced, opposed, substantially parallel surfaces snugly receiving the associated decorative strip end region therebetween.

13. In a light fixture as in claim 11, a decorative strip engaging hook defined in said strip end region retainer recesses adjacent said opening thereof and extending toward the lens outer surface, said hooks engaging the end regions of the decorative strip received within said retainer's recess.

14. A light fixture lens having a convex outer surface configuration, an elongated, resilient, decorative strip having an adhesive side and end regions, the strip being adhered to and across the lens convex surface configuration, the improvement comprising spaced decorative strip end region retainers mounted on the lens receiving the strip end regions and preventing displacement of the strip end regions from the lens outer surface, said strip end region retainers being located adjacent the lens convex outer surface and maintaining the strips' end regions in engagement with the lens outer surface and being homogeneously formed of the material of the lens.

15. A light fixture lens having a convex outer surface configuration, an elongated, resilient, decorative strip having an adhesive side and end regions, the strip being adhered to and across the lens convex surface configuration, the improvement comprising spaced decorative strip end region retainers mounted on the lens receiving the strip end regions and preventing displacement of the strip end regions from the lens outer surface, said strip end region retainers being located adjacent the lens convex outer surface and maintaining the strips' end regions in engagement with the lens outer surface, the lens including side edge heads, said strip end region retainers being defined in said lens's side edge heads.

16. In a light fixture lens as in claim 15, said strip end region retainers comprising elongated recesses defined in said lens side edge heads each having an opening located adjacent the lens outer surface receiving a decorative strip end region.

17. In a light fixture lens as in claim 16, said recesses each including spaced, opposed, substantially parallel surfaces snugly receiving the associated decorative strip end region therebetween.

18. In a light fixture lens as in claim 16, a decorative strip engaging hook defined in said strip end region retainer recesses adjacent said opening thereof and extending toward the lens outer surface, said hooks engaging the end regions of the decorative strip received within said retainer's recess.

* * * * *